US008865024B2

(12) United States Patent
Müller et al.

(10) Patent No.: US 8,865,024 B2
(45) Date of Patent: Oct. 21, 2014

(54) LIPOPHILIC ANTIOXIDANT

(75) Inventors: Michael Müller, Dietenhelm (DE);
Peter Horlacher, Bellenberg (DE);
Katja Beck, Bellenberg (DE)

(73) Assignee: Cognis IP Management GmbH, Duesseldorf (DE)

( * ) Notice: Subject to any disclaimer, the term of this patent is extended or adjusted under 35 U.S.C. 154(b) by 0 days.

(21) Appl. No.: 12/333,106

(22) Filed: Dec. 11, 2008

(65) Prior Publication Data

US 2009/0152502 A1 Jun. 18, 2009

(30) Foreign Application Priority Data

Dec. 13, 2007 (EP) .................................... 07024183

(51) Int. Cl.
C09K 15/00 (2006.01)
C09K 15/34 (2006.01)
C11B 5/00 (2006.01)
A23D 7/00 (2006.01)
A23D 9/00 (2006.01)
A21D 2/16 (2006.01)
A23D 7/01 (2006.01)
A23D 7/005 (2006.01)
A23D 9/007 (2006.01)
A23D 9/013 (2006.01)

(52) U.S. Cl.
CPC .............. *C11B 5/0035* (2013.01); *A23D 7/011* (2013.01); *A23D 7/0053* (2013.01); *A23D 9/007* (2013.01); *A23D 9/013* (2013.01)
USPC ........... 252/404; 252/398; 426/541; 426/542; 426/601; 426/654

(58) Field of Classification Search
USPC ........... 252/398, 404; 426/541, 542, 601, 654
See application file for complete search history.

(56) References Cited

U.S. PATENT DOCUMENTS

| | | | |
|---|---|---|---|
| 2,452,943 A | 11/1948 | Malkemus et al. | |
| 2,868,812 A | 1/1959 | Gray | |
| 4,832,876 A | 5/1989 | Ahmed | |
| 5,795,942 A | 8/1998 | Rhee et al. | |
| 6,194,020 B1 * | 2/2001 | Myers et al. | 426/631 |
| 2002/0065328 A1* | 5/2002 | Dederen et al. | 516/9 |
| 2003/0054082 A1 | 3/2003 | Koike et al. | |
| 2003/0215560 A1* | 11/2003 | Todd et al. | 426/650 |
| 2004/0052920 A1* | 3/2004 | Koike et al. | 426/601 |
| 2005/0123667 A1 | 6/2005 | Sakuma et al. | |
| 2007/0087104 A1 | 4/2007 | Chanamai | |

FOREIGN PATENT DOCUMENTS

| | | |
|---|---|---|
| AU | 784481 B2 | 1/2002 |
| EP | 0532557 B2 | 3/1993 |
| JP | 63-135483 | 6/1988 |
| KR | 2001079020 A | 8/2001 |
| WO | 94/22321 A1 | 10/1994 |
| WO | WO 2007060174 A1 * | 5/2007 ............. B01F 17/00 |

OTHER PUBLICATIONS

"1H- and 13C-NMR spectroscopy of synthetic monosulfated methyl α-D-mannopyranosides" R. Ruiz Contreras Recueil Des Travauz Chimiques Des Pays-Bas, vol. 110, No. 3, 1991, pp. 85-88; XP-002552613.
ROMPP Online, Version 3.0 Catechine http://www.roempp.com/prod/roempp.php Nov. 9, 2007, pp. 1-2.
ROMPP Online, Version 3.0 Tee http://www.roempp.com/prod.roempp.php Nov. 9, 2007, pp. 1-9.
"Tensid-Taschenbuch" 2. Ausgabe, herausgegeben von H. Stache, Carl Hanser Verlag Munchen Wien 1981, 2 pages.
"Emulgatoren fur Lebensmittel" Herausgegeben von Gregor Schuster Springer-Verlag, 1985, pp. 82-87.
"Polyphenols, Anthocyanins, Ascorbic Acid, and Radical Scavenging Activity of Rubus, Ribes, and Aronia" Journal of Food Science: Food chemistry and Toxicology—vol. 69, Nr. 3, 2004, pp. 164-169 S. Benvenuti, F. Melegari, and D. Bertelli.
"Antioxidative effects of tea polyphenols and lard emulsion system" Food Science, China 1999 20 (5) 9-11 S. T. Jiang et al.
HLB Systems, HLB Values of some Surfactants http://web.archive.org/web/20010724180753/http://pharmcal.tripod May 27, 2008, pp. 1-3.
"Antioxidative properties of black tea" W. Luczaj et al. Preventive Medicine 2005, 40, pp. 910-918.
"Antioxidant Activity of Carnosic Acid and Methyl Carnosate in Bulk Oils and Oil-in-Water Emulsions" Shu-Wen Huang et al. J. Agric. Food Chem. 1996, 44, pp. 2951-2956.
"Antioxidant Activity of Tea Catechins in Different Lipid Systems" Shu-Wen Huang et al. J. Agric. Food Chem. 1997, 45, pp. 3033-3038.
International Search Report from EPO Application No. 08021049.5-1221, dated Mar. 20, 2009.

* cited by examiner

*Primary Examiner* — Harold Pyon
*Assistant Examiner* — Tanisha Diggs
(74) *Attorney, Agent, or Firm* — Servilla Whitney LLC

(57) ABSTRACT

The present invention relates to a composition containing a first component selected from the group consisting of at least one polyphenol, at least one phenolic diterpene and combinations thereof, (b) at least one glyceride, (c) at least one hydrophilic emulsifier, and (d) at least one hydrophobic emulsifier. Also disclosed is the use of this composition as a lipophilic antioxidant.

12 Claims, No Drawings

LIPOPHILIC ANTIOXIDANT

CROSS REFERENCE TO RELATED APPLICATIONS

This application claims priority to EPO patent application number 07024183.1 filed Dec. 13, 2007, which is incorporated herein by reference in its entireties.

FIELD OF THE INVENTION

The present invention relates to a composition containing a first component selected from the group consisting of at least one polyphenol, at least one phenolic diterpene and mixtures of both, at least one glyceride, at least one hydrophilic emulsifier and at least one hydrophobic emulsifier, and also to the use of this mixture as lipophilic antioxidant.

BACKGROUND OF THE INVENTION

Conventionally tocopherols and ascorbyl palmitate are used in order to protect, for example, oils containing fatty acids having at least one double bond from oxidation.

Catechins are natural substances which occur in nature as plant components. They are hydrogenated flavones. Catechins include, in particular, catechin, epicatechin, gallocatechin and epigallocatechin. In the sense of the present invention, "catechin" or "a catechin" always means a compound selected from the group of catechins. "Catechin" is not the catechin meant in the narrow sense. If the catechin in the narrow sense is meant, then this will be also designated "catechin in the narrow sense". Catechins occur, for example, in green tea and can be extracted from this. Dried leaves of green tea can contain, for example, 8.5 to 20.6% by weight of catechins. Information on catechins and catechins in green tea may be found, e.g., in Römpp Online, Version 3.0, published by Georg Thieme Verlag, under the headwords "Catechine" [Catechins] and "Tee" [Tea].

Catechins are active antioxidants and also have other beneficial properties. However, catechins are hydrophilic and therefore cannot readily be used as antioxidants in lipophilic media. It is therefore desirable to make catechins available as antioxidants for lipophilic media.

Catechins are highly water soluble but very sparingly oil-soluble antioxidants. Recent scientific studies verify in addition health-promoting properties of catechins such as, e.g., accelerated fat combustion, anticarcinogenic activity etc. The oil insolubility restricts the formulation ability of catechins to aqueous systems which prevents their use as additives for oils or a mixture of oils.

In addition to catechins, polyphenols in general, in particular those having antioxidant properties, are also usable as antioxidants. It is therefore desirable to be able to use not only catechins, but polyphenols in general, as antioxidants in lipophilic media also.

If there were a way to incorporate polyphenols, in particular catechins, in a corresponding amount in a stable manner in oils, not only would the very good antioxidant power of polyphenols be usable for oils, but also the health-promoting activity of polyphenols would be able to be combined with those of oils and/or oil formulations. Preferably, the formulations should be free from short-chain and medium-chain alcohols.

Diterpenes are natural substances having 20 carbon atoms which are made up of four isoprene units. They belong to the terpene group. Compounds designated diterpenes are not only hydrocarbons, but also derivatives of the corresponding hydrocarbons. Phenolic diterpenes are those diterpenes which contain at least one phenolic OH group. Carnosolic acid belongs to the phenolic terpenes.

WO 94/22321 discloses solutions of catechins in nonionic solvents. These solutions can be used as antioxidants in fats and oils. As solvents, in particular nonionic surfactants are disclosed, in particular lecithin and fatty alcohols having 8-18 carbon atoms are disclosed. In example 7, inter alia, also glycerol monooleate is disclosed as solvent. However, this has the disadvantage that catechins are only soluble therein at a low concentration and that frequently cloudy oils are obtained.

KR 2001079020 and JP-A 63135483 likewise disclose lipophilic antioxidants which contain catechins.

The object of the present invention was to provide substances which are usable as lipophilic antioxidants.

DETAILED DESCRIPTION OF THE PREFERRED EMBODIMENTS

This object is achieved by a composition containing a first component selected from the group consisting of at least one polyphenol (in particular a polyphenol having antioxidant properties, preferably at least one catechin), at least one phenolic diterpene (preferably carnosolic acid) and mixtures of both, at least one glyceride, at least one hydrophilic emulsifier and at least one hydrophobic emulsifier, wherein the hydrophilic emulsifier is selected from the group consisting of DATEM, CITREM, LACTEM, ACETEM and a sugar ester. This composition according to the invention is subject matter of the present invention.

A particular embodiment of the present invention is the composition according to the invention, wherein the first component is a catechin or a mixture of catechins and wherein this is preferably in the form of an extract of the leaves of green tea.

A further particular embodiment of the present invention is the composition according to the invention or one of the particular compositions mentioned in the paragraphs hereinbefore, wherein the first component is a phenolic diterpene or a mixture of phenolic diterpenes, preferably carnosolic acid.

A further particular embodiment of the present invention is the composition according to the invention or one of the particular compositions mentioned in the paragraphs hereinbefore, wherein the glyceride is a triglyceride, the three fatty acids of which each have 6 to 18 carbon atoms.

A further particular embodiment of the present invention is the composition according to the invention or one of the particular compositions mentioned in the paragraphs hereinbefore, wherein the hydrophilic emulsifier is selected from the group consisting of DATEM, CITREM, LACTEM and ACETEM.

A further particular embodiment of the present invention is the composition according to the invention or one of the compositions mentioned in the paragraphs hereinbefore, wherein the hydrophilic emulsifier is a sugar ester.

A further particular embodiment of the present invention is the composition according to the invention or one of the particular compositions mentioned in the paragraphs hereinbefore, wherein the hydrophobic emulsifier is selected from the group consisting of a polyglycerol polyricinoleate, a polyglycerol ester of fatty acid and glycerol monoester of fatty acid (i.e. a monoglyceride; in particular such a monoglyceride having a fatty acid having 10 to 30 carbon atoms, in particular glycerol monooleate or glycerol monostearate).

A further particular embodiment of the present invention is the composition according to the invention or one of the particular compositions mentioned in the paragraphs hereinbefore, additionally containing water.

A further particular embodiment of the present invention is the composition according to the invention or one of the particular compositions mentioned in the paragraphs hereinbefore, containing 1 to 20% by weight, in particular 5 to 15% by weight, of the first component, 2 to 70% by weight, in particular 20 to 50% by weight of glyceride, 3 to 60% by weight, in particular 15 to 35% by weight of hydrophilic emulsifier, 3 to 60% by weight, in particular 15 to 35% by weight, of hydrophobic emulsifier and 0 to 30% by weight, in particular 0 to 1% by weight, of water.

The present invention further relates to a process for producing the composition according to the invention or one of the compositions mentioned in the paragraphs hereinbefore which comprises providing a mixture containing the hydrophilic emulsifier and the hydrophobic emulsifier, optionally warming this mixture to a temperature of at least 50° C., adding the first component to this mixture (optionally with stirring) and thereafter adding the glyceride.

The present invention further relates to a use of the composition according to the invention or of one of the particular compositions mentioned in the paragraphs hereinbefore as antioxidant for lipophilic media, wherein the lipophilic medium preferably contains an oil or fat and in particular is a food.

The present invention further relates to a second composition containing oil or fat and, based on the mass of the oil or fat, 0.05 to 3% by weight of the composition according to the invention or of one of the particular compositions mentioned in the paragraphs hereinbefore.

A further particular embodiment of the present invention is said second composition, wherein the oil or fat is selected from the group consisting of a fat or oil which contains unsaturated fatty acid radicals (in particular radicals of linoleic acid, linolenic acid or oleic acid), fish oil, sunflower oil, borage oil, a glyceride which contains acyl radicals of conjugated linoleic acid and a triglyceride, the acyl radicals of which have 6 to 24 carbon atoms.

A further particular embodiment of the present invention is the second composition according to any of the paragraphs hereinbefore, wherein the second composition is an oil-in-water emulsion.

A further particular embodiment of the present invention is the second composition according to any of the paragraphs hereinbefore, wherein the second composition is granules or a powder.

Powders for the purposes of the present invention are also all further formulations having a solids character, such as, e.g., granules.

A further particular embodiment of the present invention is the second composition according to any of the paragraphs hereinbefore, wherein the second composition is a food, in particular one such selected from the group consisting of an oil, a fat, olive oil, butter, margarine, milk, a milk product, cheese, yogurt, a chocolate bar and a muesli bar.

According to the present invention the hydrophilic emulsifier can be selected, in particular, from the group consisting of DATEM, CITREM, LACTEM and ACETEM. In this case DATEM is a composition of matter containing mono- and diacetyl tartaric esters of mono- and diglycerides of edible fatty acids, in particular DATEM is a composition of matter which contains substituted glycerol molecules which are esterified at at least two OH groups and which bear at least one fatty acid radical (more than 50 mol % of the fatty acid radicals have 16 or 18 carbon atoms) and which bear at least one tartaric acid radical which in turn is monoacetylated or diacetylated. CITREM is a composition of matter containing citric esters of mono- and diglycerides of edible fatty acids. LACTEM is a composition of matter containing lactic esters of mono- and diglycerides of edible fatty acids. ACETEM is a composition of matter containing acetic esters of mono- and diglycerides of edible fatty acids. Edible fatty acids have, in particular, 6 to 24 carbon atoms.

A hydrophobic emulsifier has an HLB value of less than 8, a hydrophilic emulsifier has an HLB value of at least 8. The HLB value can be determined for nonionic emulsifiers in accordance with Griffin, and for ionic emulsifiers in accordance with Davies. For determination of HLB values see: Tensid-Taschenbuch [Surfactant Handbook], 2nd edition, edited by H. Stache, Carl Hanser Verlag, 1981.

The designation PGPR (polyglycerol polyricinoleate) summarizes esters of polycondensed castor oil fatty acids with polycondensed glycerol. Ricinoleic acid is 12-hydroxy-oleic acid and can form a polyester with itself. Esters of polycondensed castor oil fatty acids with polycondensed glycerol are permitted as a food additive in Germany under the designation E 476. Polyglycerol fatty acid esters can, for example, have the composition of the commercial product Polymuls® 2G from Cognis GmbH, Monheim, Germany. This is a mixture of (% in each case is % by weight) fatty acid monoesters of diglycerol: 65-75%, fatty acid monoesters of glycerol: 15-20%, fatty acid diesters of glycerol: 5-10%, total glycerols: 30-40%, free glycerols: 2-5%.

A sugar ester for the purposes of the present invention is, in particular, an ester of a molecule of a sugar selected from the group consisting of sucrose, fructose, glucose and trehalose (sucrose is preferred) and one to three molecules of edible fatty acid (preferably a fatty acid having 6 to 24 carbon atoms).

A glyceride for the purposes of the present invention is an ester of glycerol with 1, 2 or 3 fatty acids. A monoglyceride here is an ester of glycerol with one fatty acid, a diglyceride is an ester of glycerol with two fatty acids and a triglyceride is an ester of glycerol with three fatty acids. Fatty acids in this case are preferably carboxylic acids having 2 to 30, in particular 2 to 20, in particular 6 to 18, in particular 8 to 10, carbon atoms. Triglycerides are glycerides which are preferred according to the invention.

CLA is an abbreviation for conjugated linoleic acid, that is for an octadecadienoic acid, wherein the two double bonds are not separated by one or more saturated carbon atoms, but start at carbon atoms no. n and n+2 (n is a natural number from 2 to 15). Preferably, the double bonds are situated either at positions 9 and 11 (9,11-octadecadienoic acid) or at positions 10 and 12 (10,12-octadecadienoic acid). In this case, cis-trans isomerism (E-Z isomerism) is possible at each double bond. The isomers possible for CLA are designated by the symbols c for cis and t for trans and by quoting the numbers for the position of the double bonds, that is to say, e.g., c9,t11-CLA. In a preferred embodiment of the present invention, CLA is c9,t11-CLA or t10,c12-CLA.

The composition according to the invention has numerous advantages over the prior art. The composition according to the invention does not have to contain alcohols. It does not have to contain glycerol monooleate; this is advantageous in some cases, since glycerol monooleate in some cases has a tendency to form β-phases which can become noticeable as unwanted deposits in formulations. For β-phases in glycerol monooleate, see "Emulgatoren für Lebensmittel" [Emulsifiers for Foods], published by Gregor Schuster, Springer-Verlag, 1985, pages 82 to 87.

All example formulations in WO 94/22321 contain the catechin only in a concentration of 2.7% by weight. The compositions according to the invention can have a catechin content which is up to approximately four times higher. That means approximately four times less (frequently undesired) auxiliaries are also introduced into the final formulation (at comparable catechin concentrations in the end formulation). In addition, the compositions according to the invention are flexible to a certain extent in the choice of glyceride (auxiliary oil). Fish oil, for example, can be used as such. The introduction of auxiliary into the end formulation can be reduced still further.

The composition according to the invention exhibits a significantly better antioxidant activity than conventional antioxidants. The very good antioxidant activity leads to an improved long-term stability and improved sensory stability of the stabilized products.

The products stabilized by the composition according to the invention have good sensory properties. For instance, they do not have, e.g., an unpleasant bitter taste as is the case with, e.g., the emulsifier polysorbate 60 (commercially available as Tween 60).

The composition according to the invention does not require any alcohols and may be formulated not only with water but also without water. The water-containing concentrates then, after dissolution in oil, preferably give a W/O microemulsion. The antioxidant activity of the composition according to the invention surpasses that of the conventional oil-soluble antioxidants at comparable concentration manyfold. This is confirmed by the stability tests which are conventional for unsaturated oils such as the Rancimat test and determination of the peroxide value.

The composition according to the invention may be incorporated into the most varied triglycerides such as, e.g., fish oils, sunflower oil, conjugated linoleic acids and medium-chain triglycerides, which enables their use in numerous foods and food supplements.

The resultant solutions generally show either no additional turbidity or, at higher concentrations, a slight additional turbidity of the oil (compared with the oil without composition according to the invention).

The production and introduction of the composition according to the invention into lipophilic media which are to be protected against oxidation can be illustrated schematically and for an example formulation as follows: dissolve, e.g., a green tea extract in water; glycerol monooleate and tartaric esters are heated with stirring (50° C.); the green tea extract/water mixture is stirred into the glycerol monooleate/tartaric ester mixture, thereafter a short-chain triglyceride is added. The resultant water can if required be removed (e.g. by freeze drying). The composition according to the invention is (preferably without heating) stirred into the corresponding oil phase or fat phase. The amount of composition which is stirred in depends on the use. If the composition principally acts as antioxidant, the amount is calculated in such a manner that the concentration of the composition in the final oil formulation or fat formulation is in the range 500-1000 ppm (coarse guide value). With other applications the concentrations are correspondingly higher.

The composition according to the invention contains, as auxiliary for solubilization, a mixture of hydrophilic and hydrophobic emulsifiers, and preferably also an auxiliary oil. The hydrophilic emulsifier is preferably the tartaric ester of mono- and diglycerides, the hydrophobic emulsifier preferably glycerol monooleate. As auxiliary oil, preferably, medium-chain triglyceride (C8/C10 triglyceride) is used.

For production of the composition according to the invention, first, preferably, a water-containing concentrate is produced, since this has a better absorption capacity for the first component than the corresponding water-free mixture. The water can, if required, be removed again (e.g. by freeze drying). The water-free concentrates especially have a tendency to give a clear solution in oil.

Typical example compositions contain the components in the following quantitative ranges (all figures in percent by mass):

| | |
|---|---|
| Green tea extract (contains approximately 70% catechins) | 5-20% |
| Glycerol monooleate | 10-35% |
| Tartaric esters | 10-35% |
| C8/C10 triglyceride | 10-50% |
| Water | 0-10% |

The compositions according to the invention are preferably introduced into the second compositions according to the invention at concentrations such that the first component of the composition according to the invention, based on the oil or fat in the second composition, is present in a concentration of 20 to 1000 ppm, preferably 30-500 ppm, particularly preferably 30-300 ppm.

The second composition according to the invention can be, in particular, a food.

EXAMPLES

In the examples, proprietary products were used which were all obtained from Cognis GmbH, Monheim, in Germany, unless stated otherwise. The table hereinafter compares the brand names and the chemical composition of the products used.

| Brand name | Chemical composition |
|---|---|
| Polymuls ® PGPR | a polyglycerol polyricinoleate |
| Polymuls ® 2G | a fatty ester polyglycerol |
| Monomuls ® 90-O18 | glycerol monooleate |
| Delios ® V | a triglyceride, the fatty acids of which have predominantly 8 or 10 carbons atoms |
| Lamegin ® DWP 2000 | an emulsifier which is one of what are termed DATEM (diacetyl tartaric ester monoglycerides); this is a composition of matter which contains glycerol molecules which are esterified at at least two OH groups, and which bear at least one fatty acid radical (chain length of the fatty acid radicals: predominantly 16 and 18 carbon atoms) and which bear at least one tartaric acid radical which in turn is monoacetylated or diacetylated. |
| Coviox ® T 90 EU | natural tocopherols |
| Hi Cap 100 | 1-octenyl succinic anhydride-esterified (OSA) starch |

All percentage figures in the examples are percent by weight, unless stated otherwise.

The following compositions were produced:

| No. | First component | Glyceride | Hydrophilic emulsifier | Hydrophobic emulsifier |
|---|---|---|---|---|
| 1 | Catechin solution (72.73% green tea powder + 27.27% water): 12.5% | 37.5% Delios ® V | 25% Lamegin ® DWP 2000 | 25% Monomuls ® 90-O18 |

-continued

| No. | First component | Glyceride | Hydrophilic emulsifier | Hydrophobic emulsifier |
|---|---|---|---|---|
| 2 | Catechin solution (72.73% green tea powder + 27.27% water): 20% | 30% Delios ® V | 25% Lamegin ® DWP 2000 | 25% Monomuls ® 90-O18 |
| 3 | Catechin solution (72.73% green tea powder + 27.27% water): 20% | 30% Delios ® V | 25% Lamegin ® DWP 2000 | 22.73% Polymuls ® PGPR and 2.27% Polymuls ® 2G |
| 4 | Catechin solution (72.73% green tea powder + 27.27% water): 20% | 30% Delios ® V | 25% Lamegin ® DWP 2000 | 25% Polymuls ® PGPR |
| 5* | 9.1% Green Tea Low Caffeine Dry Extract (contained approximately 70% catechins) | 37.5% Delios ® V | 25% Lamegin ® DWP 2000 | 25% Monomuls ® 90-O18 |
| 6* | 9.4% Green Tea Low Caffeine Dry Extract (contained approximately 70% catechins) | 38.8% Delios ® V | 25.9% Lamegin ® DWP 2000 | 25.9% Monomuls ® 90-O18 |

*Composition No. 6 was obtained by removing the water from composition No. 5. Composition No. 5 contained 3.4% water.

Production of a Polyphenol Mixture Based on Catechin 25 g of Monomuls® 90-O18 and 25 g of Lamegin® DWP 2000 were warmed to approximately 50° C. and mixed and melted with stirring. Subsequently 12.5 g of a catechin mixture consisting of "green tea low caffeine dry extract" (caffeine: 0.33%; epigallocatechin gallate: 42.7%; catechins in total: 70.46%) and water were stirred into the emulsifier premix. After homogeneous distribution, 37.5 g of MCT (Delios® V) were added. Subsequently the water was removed by freeze drying.

Production of the Catechin-Containing Fish Oil

The above-described polyphenol mixture based on catechin was stirred into fish oil:

0.76 g of the polyphenol mixture based on catechin in 99.24 g of fish oil 18/12: concentration therefore 500 ppm 1.52 g of the polyphenol mixture based on catechin in 98.48 g of fish oil 18/12 concentration therefore 1000 ppm.

Fish oil 18/12 is fish oil containing 18% EPA (eicosapentaenoic acid) and 12% DHA (docosahexaenoic acid)

The table hereinafter makes clear the stabilizing activity of catechin compared with conventional antioxidants and mixtures thereof based on the induction periods (as a measure of oxidative stability) determined using the Rancimeter.

Rancimat method for measuring oxidation stability:

In the Rancimat method, the sample is exposed to an airstream at temperatures of 50-220° C. The high-volatility oxidation products (the majority formic acid) are transferred by the airstream into the measurement vessel and there absorbed in the measurement solution (distilled water). In continuous recording of the conductivity of this measurement solution, oxidation curves are obtained, the inflection point of which is designated induction time, and is a good characteristic value for oxidation stability. The Rancimat method was developed as an automated variant of the extremely complex active oxygen method (AOM) for determining the induction time of fats and oils. In the course of time, the method has established itself and found use in various national and international standards, for example AOCS Cd 12b-92 and ISO 6886.

TABLE
Rancimat test of fish oil 18/12

| Antioxidant | Induction period |
|---|---|
| Not stabilized | 1.08 h |
| 4400 ppm Coviox ® T 90 EU | 2.50 h |
| 4400 ppm Coviox ® T 90 EU + 500 ppm ascorbylpalmitate | 4.30 h |
| 500 ppm catechin | 10.8 h |
| 1000 ppm catechin | 16.0 h |

Conditions: 5 g at 120° C. with 20 l of air per hour

Production of a Catechin-Containing Fish Oil Powder

The catechin mixture described hereinbefore was stirred into the fish oil in an appropriate amount. The catechin-containing oil was mixed with the water phase and corresponding amounts of emulsification aids and homogenized.

The resultant emulsion was then freed from the water by a suitable process (e.g. spray-drying) so as to arrive at a powder/granules.

Example of a Formulation for Removal of the Water

|  | Mass/g |
|---|---|
| Fish oil 18/12 | 50.00 |
| Na Caseinate | 10.00 |
| Glucose DE 29 | 24.00 |
| Hi Cap 100 | 6.00 |
| Soya protein | 10.00 |
| Antioxidant catechin (1000 ppm catechin in oil) |  |
| Water | 150.0 |

Uses of the Catechin-Containing Fish Oil Powder in Milk Products

Incorporation of 2.67 g of the powder hereinbefore in 150 ml of milk (optionally with subsequent pasteurization)

Incorporation of 2.67 g of the powder hereinbefore into 150 ml of yogurt. The incorporation can proceed a) by using the abovementioned fish oil-containing milk, which is then processed by a corresponding fermentation process to give a yogurt or b) by adding the powder directly into the yogurt or via the fruit phase into a yogurt.

Use of a Polyphenol-Containing Fish Oil Powder in a Bar

Example formula of a fish oil-containing cereal bar. Fish oil or fish oil powder contained the amounts of catechin mentioned in examples hereinbefore.

| Composition | [%] |
|---|---|
| Fish oil powder (15% PUFA) | 1.90 |
| Sugar | 12.15 |
| Glucose syrup solid | 18.90 |
| Sorbitol (powder) | 2.70 |
| Water | 11.25 |
| Sunflower oil | 4.85 |
| Lecithin (liquid) | 0.15 |
| Cornflakes | 19.90 |
| Oat flakes | 8.10 |
| Wheat flakes | 8.10 |
| Raisins (sultanas) | 10.50 |

-continued

| Composition | [%] |
|---|---|
| Banana chips | 1.20 |
| Apple pieces | 0.30 |
| Total | 100.00 |

Production of the Bar:

Step 1: Production of the syrup mixture:

mix 12.5 g of sugar, 18.9 g of glucose syrup, 2.7 g of sorbitan powder and 11.25 g of water and heat it to approximately 60° C.

Step 2: Production of the fat mixture:

mix 4.85 g of sunflower oil and 0.15 g of lecithin and heat to approximately 60° C.

Step 3: Add the fat mixture to the syrup mixture and heat the mixture to 90-95° C.

Step 4: Production of the cereal mixture:

mix 1.90 g of fish oil powder with the cereals and optionally with further components (such as flavorings/aroma substances, vitamins, minerals). Alternatively, the fish oil (powder or oil) can be added directly to the fat mixture.

Step 5: Add the cereal mixture to the syrup mixture

Step 6: Feed to the roller compactor

Step 7: Cooling and cutting of the bars

Further Examples

% always means percent by weight.

The following further examples relate to PUFA emulsions (PUFA=polyunsaturated fatty acid) stabilized with phenols and/or polyphenols. These are water-in-oil emulsions of PUFA-containing oils or fats, e.g. fish oil.

These emulsions display significantly better sensory properties and oxidative stability than conventionally stabilized emulsions, even after thermal stress such as, e.g., pasteurization.

An o/w emulsion was produced using a high-pressure homogenizer and emulsification aids (emulsifiers). The oil-soluble components are charged for this in the oil phase, the water-soluble components in the water phase. A heating of the phases can accelerate the solution process. The two phases are combined and homogenized using the homogenizer. Addition of the phenols/polyphenols proceeds, according to their solubility, either to the water phase or oil phase. In the case of carnosolic acid, addition is via the oil phase, in the case of catechin the addition is via the water phase or, if the catechin was appropriately preformulated, also via the oil phase.

A typical formulation is the following:

40-60% fish oil (Omevital® 18/12 TG Gold, obtainable from Cognis GmbH, Monheim, Germany)

0.5-10% modified starch (Hi-Cap 100, obtainable from National Starch)

0.5-10% whey protein hydrolysate pH regulators such as lactic acid and/or citric acid content of phenols/polyphenols (including the corresponding esters) of 20-1000 ppm, preferably 30-500 ppm, particularly preferably 30-300 ppm, based on the oil phase or water phase remainder: water A further typical formulation is the following:

40-60% fish oil (Omevital® 18/12 TG Gold, Cognis)

0.5-10% sucrose ester (Sisterna SP 70, Sisterna)

0.5-10% lecithin (rapeseed lecithin)

0-10% whey protein hydrolysate pH regulators such as lactic acid and/or citric acid preferred content of phenols/polyphenols (including the corresponding esters) of 20-1000 ppm, preferably 30-500 ppm, particularly preferably 30-300 ppm, based on the oil phase or water phase remainder: water The viscosity of the emulsions is below 5000 mPas, preferably below 3000 mPas, particularly preferably below 1500 mPas.

A trained test panel rated the PUFA emulsions stabilized with phenols/polyphenols as superior compared with non-stabilized emulsions or emulsions stabilized in a conventional manner.

Advantage: high sensory and oxidative stability. Even after thermal stress such as pasteurization.

These emulsions can be used in the following food matrices:

dairy products (milk, yogurt, drinking yogurt, cheese etc.)

drinks in general milk-based fruit drinks and soft drinks soya-based fruit drinks and soft drinks liquid food supplements These emulsions can be produced as follows:

charge deionized water into stirring equipment stir in HI-CAP emulsifier at RT heat to 80-85° C. (duration 10 min), at approximately 60° C. add whey protein concentrate hold for 10 min (heating step)

cool to 15-20° C. (duration 15 min)

dissolve antioxidant in subquantity of fish oil or water, added add fish oil adjust with anhydrous citric acid to pH 4.0 stirred for 5 min (emulsification)

homogenized 1× at a pressure of 230/30 bar, viscosity: 240 mPas pasteurization (optional)

emulsion of experiment 1 heated to 80° C. in the water bath in 100 ml square bottles, duration approximately 15 min heated for 5 minutes further, 85° C.

bottles removed from water bath, placed turned over into the refrigerator viscosity: 210 mPas (pasteurized)

Further Formulation Examples

| A | |
|---|---|
| 500 g | Omevital ® 18/12 TG Gold |
| 30 g | modified starch HI-CAP 100 |
| 450 g | water |
| 20 g | whey protein hydrolysate |
| 2 g | anhydrous citric acid |
| 125 mg | catechin (=250 ppm based on water phase) |

| B | |
|---|---|
| 500 g | Omevital ® 18/12 TG Gold |
| 30 g | modified starch HI-CAP 100 |
| 450 g | water |
| 20 g | whey protein hydrolysate |
| 2 g | anhydrous citric acid |
| 125 mg | carnosolic acid (=250 ppm based on oil phase) |

| | C |
|---|---|
| 500 g | Omevital ® 18/12 TG Gold |
| 30 g | modified starch HI-CAP 100 |
| 450 g | water |
| 20 g | whey protein hydrolysate |
| 2 g | anhydrous citric acid |
| 62.5 mg | catechin (=125 ppm based on water phase) |
| 62.5 mg | carnosolic acid (=125 ppm based on oil phase) |

Example D

Use of the Emulsion in Milk 1 g of emulsion from the above example is added to 99 g of milk (fat content 1.5%) with stirring. Optionally, pasteurization can proceed thereafter.

Example C

Use of the Emulsion in Yogurt

The product according to Example A was added according to Example D to milk. After homogenization at 200 bar, the milk was cooled to 45° C. 50 g of bacterial starter culture for yogurt (YC 180 from Chr. Hansen) were added to 450 g of the milk dispersion. For the fermentation, various samples were placed in an incubator at 45° C. After reaching a pH of 4.5 to 4.6, the samples were cooled, 7% sugar was added with stirring (to obtain a stirred yogurt) or they were homogenized at 80 to 100 bar (to obtain a drinking yogurt).

What is claimed is:

1. A composition consisting of:
   (a) 1-20% by weight, based on the composition, of a first component selected from the group consisting of at least one polyphenol, at least one phenolic diterpene and combinations thereof,
   (b) 2-70% by weight, based on the composition, of at least one glyceride,
   (c) 3-60% by weight, based on the composition, of at least one hydrophilic emulsifier, and
   (d) 3-60% by weight, based on the composition, of at least one hydrophobic emulsifier,
wherein said hydrophilic emulsifier (c) is selected from the group consisting of mono- and diacetyl tartaric mono- and diglycerides of edible fatty acids, citric mono- and diglycerides of edible fatty acids, lactic mono- and diglycerides of edible fatty acids, acetic mono- and diglycerides of edible fatty acids, and sugar esters.

2. The composition of claim 1, wherein component (a) is a catechin or a mixture of catechins.

3. The composition of claim 1, wherein component (a) is carnosolic acid.

4. The composition of claim 1, wherein said hydrophilic emulsifier is selected from the group consisting of mono- and diacetyl tartaric mono- and diglycerides of edible fatty acids, citric mono- and diglycerides of edible fatty acids, lactic mono- and diglycerides of edible fatty acids, and acetic mono- and diglycerides of edible fatty acids.

5. The composition of claim 1, wherein said hydrophilic emulsifier is a sugar ester.

6. The composition of claim 1, wherein said hydrophobic emulsifier is selected from the group consisting of polyglycerol polyricinoleates, polyglycerol esters of fatty acids, and glycerol monoesters of fatty acids.

7. The composition of claim 6, wherein said hydrophobic emulsifier is a monoglyceride of a fatty acid having about 10 to about 30 carbon atoms.

8. The composition of claim 6, wherein said hydrophobic emulsifier is selected from the group consisting of glycerol monooleate and glycerol monostearate.

9. A process for producing the composition of claim 1 which comprises:
   (i) providing a mixture consisting of the hydrophilic emulsifier (c) and the hydrophobic emulsifier (d),
   (ii) adding component (a) to this mixture, and
   (iii) thereafter adding the glyceride component (b).

10. A method for improving the oxidation susceptibility of lipophilic media comprising adding the composition of claim 1 to the lipophilic medium, in an amount effective to improve the oxidation resistance over said medium without the added composition.

11. A composition consisting of:
   at least one oil or fat, and
   about 0.05 to 3% by weight, based on the weight of said at least one oil or fat, of a composition consisting of:
      (a) 1-20% by weight of a first component selected from the group consisting of at least one polyphenol, at least one phenolic diterpene and combinations thereof,
      (b) 2-70% by weight of at least one glyceride,
      (c) 3-60% by weight of at least one hydrophilic emulsifier, and
      (d) 3-60% by weight of at least one hydrophobic emulsifier,
   wherein said hydrophilic emulsifier (c) is selected from the group consisting of mono- and diacetyl tartaric mono- and diglycerides of edible fatty acids, citric mono- and diglycerides of edible fatty acids, lactic mono- and diglycerides of edible fatty acids, acetic mono- and diglycerides of edible fatty acids and sugar esters.

12. The composition of claim 11, wherein said oil or fat is selected from the group consisting of fats and oils which contain unsaturated fatty acid moieties, fish oil, sunflower oil, borage oil, glycerides which contain acyl moieties of conjugated linoleic acid, and triglycerides having acyl moieties of 6 to 24 carbon atoms.

* * * * *

UNITED STATES PATENT AND TRADEMARK OFFICE
CERTIFICATE OF CORRECTION

PATENT NO. : 8,865,024 B2  
APPLICATION NO. : 12/333106  
DATED : October 21, 2014  
INVENTOR(S) : Michael Müller et al.

Page 1 of 1

It is certified that error appears in the above-identified patent and that said Letters Patent is hereby corrected as shown below:

On The Title Page, (75) Inventors: "Michael Müller, Dietenhelm (DE)" should be changed to --Michael Müller, Dietenheim (DE)--.

Signed and Sealed this
Third Day of February, 2015

Michelle K. Lee
*Deputy Director of the United States Patent and Trademark Office*